United States Patent Office 2,942,927
Patented June 28, 1960

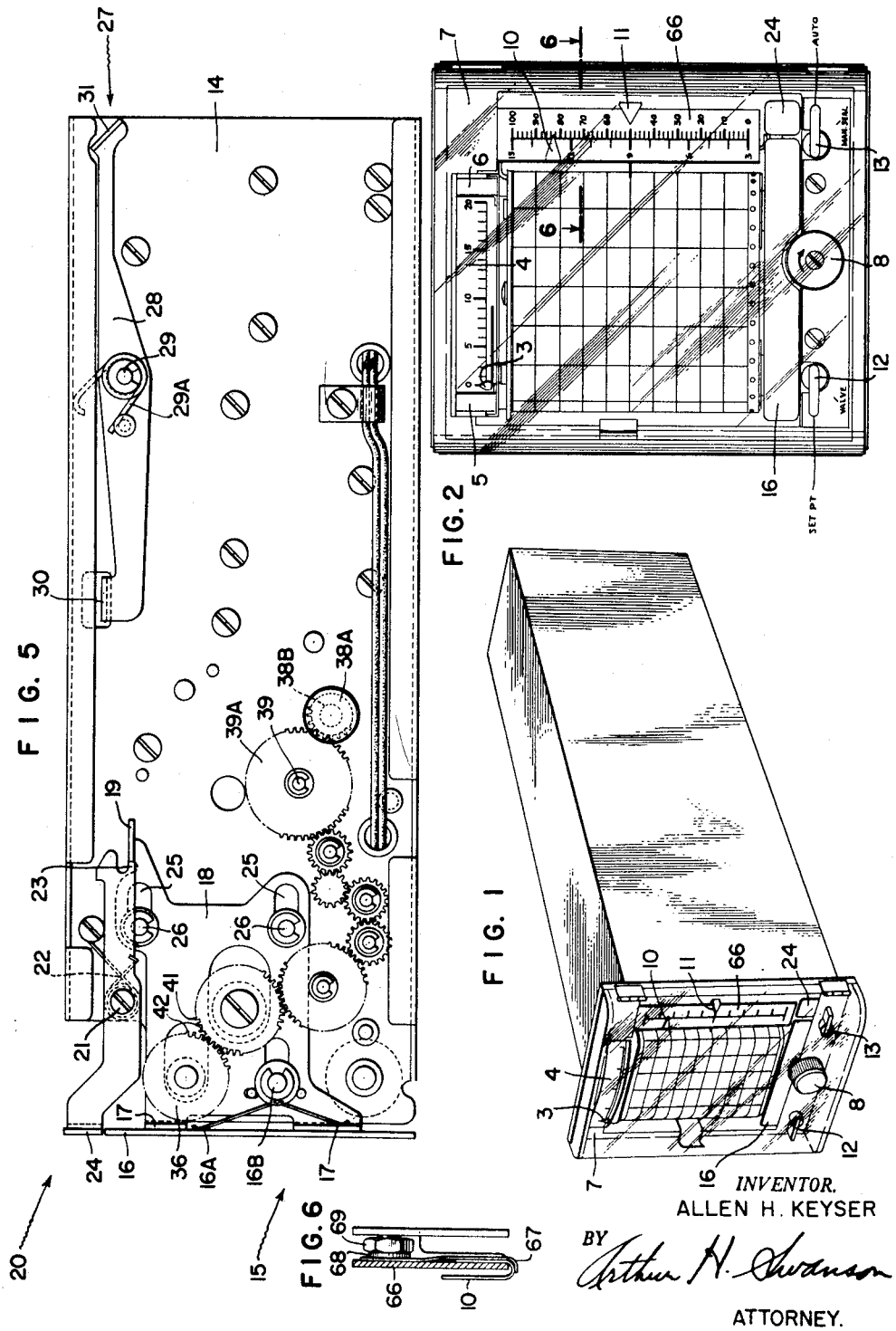

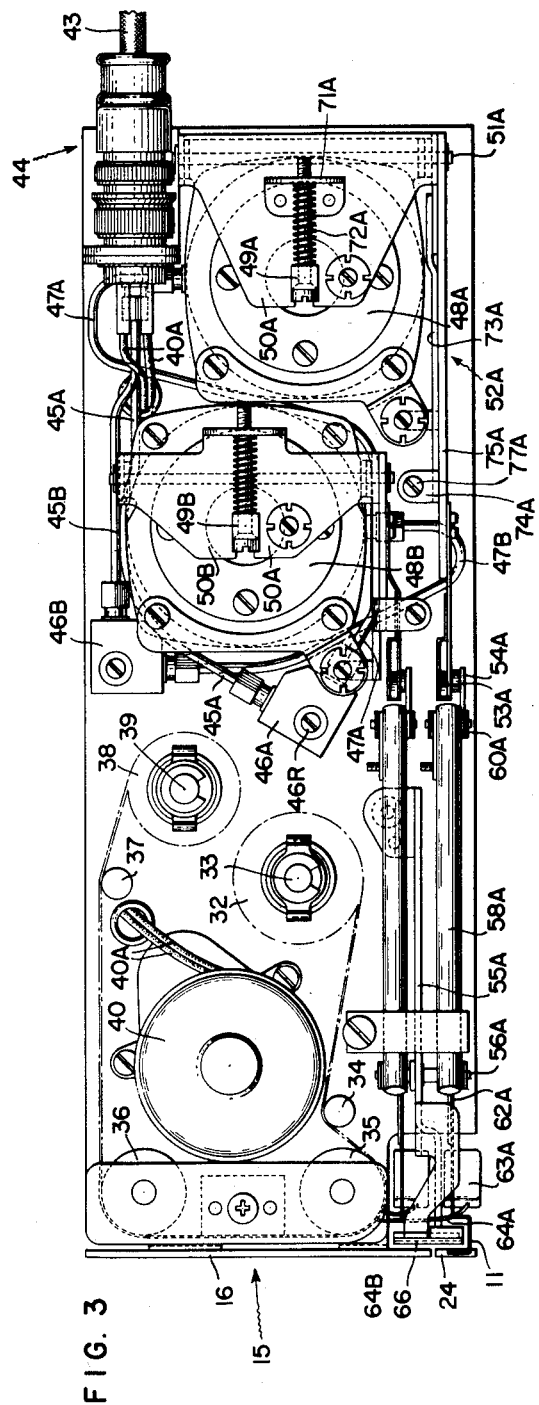
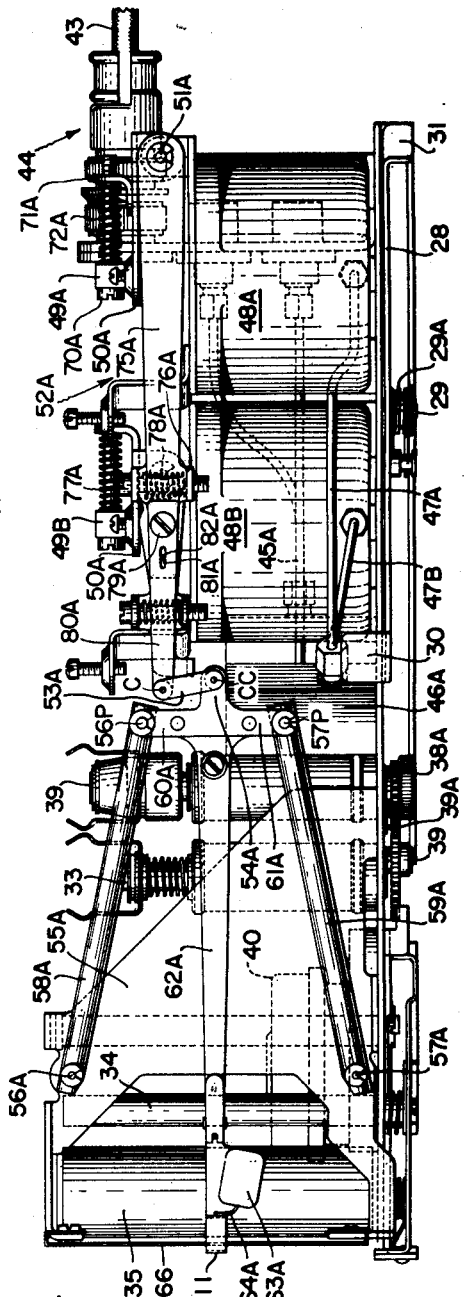

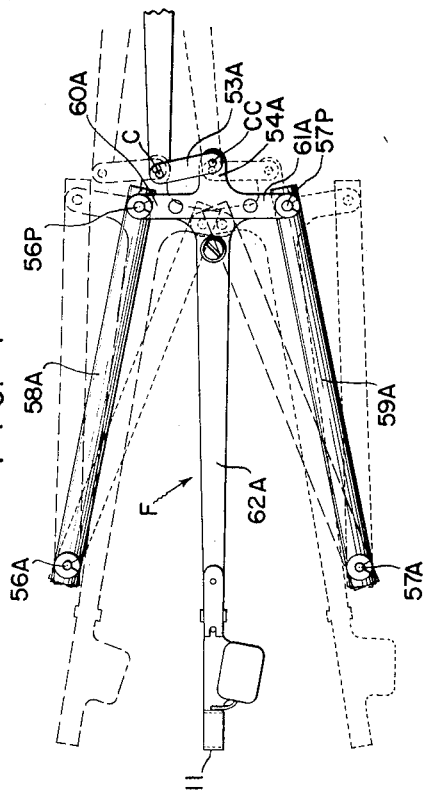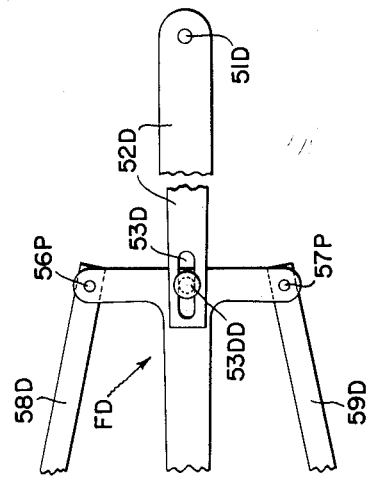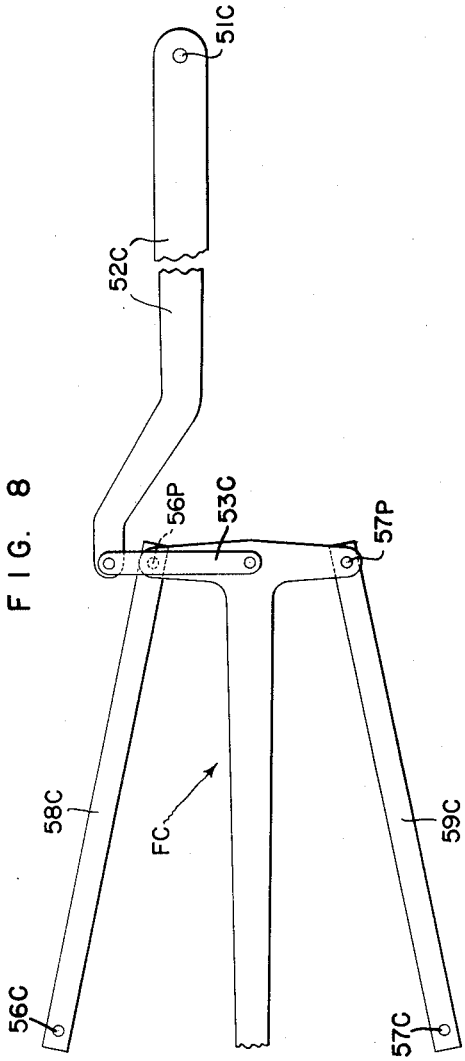

2,942,927
STRAIGHT-LINE RECORDING AND INDICATING INSTRUMENT

Allen H. Keyser, Worcester, Pa., assignor to Minneapolis-Honeywell Regulator Company, Minneapolis, Minn., a corporation of Delaware Filed Jan. 5, 1955, Ser. No. 479,968

11 Claims. (Cl. 346—17)

Among the objects of this invention are to provide an instrument for accurately indicating, recording, and/or controlling process variables, which instrument operates more simply and is more easily installed and adjusted than those heretofore known.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 1 is a perspective view of the recorder;

Fig. 2 is a front view of the case with the transparent door closed;

Fig. 3 is a top or plan view of the chassis;

Fig. 4 is a side elevation of the chassis;

Fig. 5 is a bottom or inverted view of the chassis;

Fig. 6 is a horizontal cross section on line 6—6 of Fig. 2 viewed in the direction of the arrows;

Fig. 7 is a diagrammatic side elevation of the selected form of four bar linkage;

Fig. 8 is a diagrammatic, side elevation showing a portion of a modified form of four bar linkage; and Fig. 9 is a diagrammatic, side elevation showing a portion of a second modified form of four bar linkage.

The instrument of this invention is useful in air-operated circuits such as those shown in U.S. Patent 2,666,585, issued January 19, 1954, to Louis Gess. Such circuits provide means for indicating, recording, and/or controlling an industrial process from a remote location referred to as the control room. Such circuits include: (1) a final control element, such as a valve, controlling an agent which affects one variable of the process under control; (2) a measuring element responsive to the measured or process variable under control; (3) a controller connected to the measuring element so that the measuring element actuates the final control element automatically in response to variations in the measured or process variable; (4) a manually operated air-pressure-regulator connected to the final control element and operable to actuate it manually; and (5) a transfer switch adapted to connect the final control element to the controller for automatic actuation or to the regulator for manual actuation.

The instrument of this invention is designed to be mounted in the control room on a vertical panel. Signals are fed to the recorder, so as to actuate the pens and pointers thereof, in the form of variable air pressures from the final control element, or from the set point mechanism or from the output of the controller, or from the regulator. The instrument includes knobs which form handles for actuating mechanically the regulator or the transfer switch or for selecting the air pressure to be applied to the receivers in the recorder.

Case

Referring to Figs. 1 and 2, the instrument is mounted on a control panel or the like (not shown) by means of a case comprising a rectangular, elongated box in which the elements of the instrument are mounted. This case has a closed back and an open front. A strong door of transparent, plastic material is fastened to the case with stainless steel hinges. This door has, at its rim, a dust ledge interfitting with the front of the case to give maximum protection against dirt to the parts lodged within the case. At the same time, this transparent door affords a clear view of the chart and scale which are visible from the front of the case. All the adjusting knobs (hereinafter mentioned) are completely enclosed when the door is shut.

There is mounted on the front of the case a pressure gauge, comprising a horizontally movable pointer 3 cooperating with a horizontal scale 4. This gauge may be connected to indicate the pressure of the air applied to the final control valve. Adjacent the ends of scale 4 are tabs 5 and 6 which may be marked "Open" and "Close," respectively, although they are not so marked in the drawing. Tabs 5 and 6 are removable and interchangeable and may be snapped on either end of the scale 4 so as to adapt the gauge to read directly acting valve pressures or reversely acting valve pressures. The case 1 need be provided in only one color. A removable bezel 7 is attached to the case. This bezel can be provided in a plurality of different colors to match the color scheme of the panel.

At the lower center of the front of the case is a pressure regulator knob 8 which provides a handle for adjusting the output of an air-pressure-regulator of known construction and not disclosed in detail herein. Knob 8 is used to adjust the set point pressure supplied to a controller which is used in conjunction with the recorder, when the final control element is being automatically controlled. Knob 8 also is used to control the air pressure supplied to the final control element, when on manual control.

Two pointers 10 and 11 operate over vertical, indicating scale 66. The first or left-hand pointer 10 is manually adjustable vertically to indicate the set point. Fig. 6 shows that pointer 10 is of generally U-shape as viewed from the bottom. The rear arm of pointer 10, which is on the right hand in Fig. 6, is yieldingly engaged by a strip 67 of flexible or springy metal which extends from top to bottom of scale 66 along the left-hand edge thereof (as seen in Figs. 1 and 2). Strip 67 is held to scale 66 by washer 68 and nut 69.

The second or right-hand pointer 11 indicates either: (1) the value of the set point pressure applied to the controller or the output pressure of the controller, when the process is on automatic control; or (2) the pressure applied to the final control valve, when on manual control.

A spring-loaded knob 12 at the lower left operates a pneumatic switch and, when held in the opposite position to that in which it is shown (i.e., the position marked with the legend "Valve"), causes the right hand pointer 11 to indicate the air pressure applied to the final control valve. When the knob 12 is in its normal position, which is the position in which it is shown, (marked with the legend "Set PT") the switch controlled by the knob 12 causes the right hand pointer 11 to indicate the output pressure of the regulator controlled by the knob 8. This is the set point pressure applied to the controller on automatic control and the manually regulable pressure applied to the final control valve on manual control.

At the lower right is knob 13 which operates a second pneumatic switch. The legend "Auto" indicates automatic control of the process, while the legend "Man." indicates manual control. The legend "Seal" indicates a position used when switching from manual to automatic control or vice versa. The use of this "Seal" position accomplishes two things: first, it locks the existing controlled air pressure in the final control valve; second, it locks the controller output air pressure out of the control system. With the knob 13 in the seal position, the final control valve will remain locked in the position which it presently occupies regardless of any changes in the regulator output or the controller air pressure.

*Chassis*

Figs. 3, 4, and 5 disclose the chassis and the parts carried thereby. This chassis comprises a flat plate or shelf 14 on which the elements of the instrument are mounted. The chassis 14 and the parts carried thereby may be slid into or out of the case 1 after opening the door 2. Fig. 5 shows that to aid in the removal of the chassis a strong T-shaped handle, generally indicated at 15, is provided at the front of the chassis. This handle comprises a flat, vertical plate 16 connected by ears 17 to a horizontal plate 18 having at its rear a vertical ear 19. A first spring bears at its front ends 16A against plate 16 and is carried intermediate its ends by stud 16B on shelf 14.

A first catch, generally indicated at 20, is pivotally attached to shelf 14 by screw 21 and is biased by second spring 22 so that its rear end 23 normally engages one face of ear 19. A flat, vertical thumb piece 24 is provided at the front of catch 20. When the thumb piece 24 is pressed, the catch 20 turns clockwise, as seen in Fig. 5, and moves vertical end 23 out of engagement with ear 19. This permits the free ends 16A of the first spring to slide the handle 15 forward to the extent permitted by the slots 25 in the horizontal plate 18. The rear portions of the slots 25 then engage the pins 26 fast on shelf 14 so that the shelf 14 and all the parts carried thereby can be drawn forward by means of the handle 15. First catch 20, in its normal position in which it is shown in Fig. 5, locks the chassis 14 to the case 1 and thus holds the chassis securely within the case. When first catch 20 is turned clockwise, as seen in Fig. 5, this engagement between the chassis and case is broken.

A second catch, generally indicated at 27, permits the chassis to be withdrawn from the case only partially. This partial withdrawal permits all necessary adjustments to be accessible. This second catch 27 comprises a generally horizontal lever 28 pivoted at 29 and having, at its forward or left-hand end, a vertical thumb piece 30. When thumb piece 30 is engaged by the hand of the operator, the catch 27 may be rotated clockwise, as seen in Fig. 5, against the bias of third spring 29A, so as to free the vertical ear 31 on the rear thereof from engagement with the part of the case 1 (not shown in Fig. 5) and thus permit the chassis and the parts carried thereby to be completely removed from the case.

*Chart drive structure*

This instrument includes a recorder which has a strip chart made up of a long, flat sheet of paper which may be rolled up. A supply roll 32 of this chart is mounted on a spindle 33. The chart is trained around pins 34 and 35 so as to extend across the front of the case. From roll 35 the chart passes over another roll 36 and a pin 37 to a take-up roll 38 mounted on a spindle 39.

The chart is adapted to be drawn off supply roll 32 and wound up on take-up roll 38 by means of a chart drive motor, indicated as an electric motor 40. Wires 40A conduct electricity to chart drive motor 40. If desired, an air-pressure-operated motor may be employed to drive the chart. Such an air-pressure-operated motor is shown in application Serial Number 407,793; filed February 24, 1954; in the name of Robert Clark DuBois; now Patent No. 2,718,878. As is best seen in Fig. 5, the output of motor 40 is a drive gear 41 which meshes with a gear 42 (driving roll 35) and with a gear train, generally indicated at 37, terminating in a final gear 39A fastened to and turning spindle 39 of take-up roll 38. A knurled knob 38A is attached to and rotates a gear 38B which meshes with gear 39A. Knob 38A provides means for moving the chart manually.

*Servomotors or receivers and pen structures*

The recorder is adapted to mark on the chart records of the values of measured or process variables. These process variables are measured, at a point remote from the recorder, by measuring apparatus which converts the variations in the measured variable to variations in air pressure. This variable air pressure is transmitted by pipes, which are connected to the recorder by screw-type, quick-connect pneumatic connectors, which permit quick removal of the chassis. The electric wires 40A for the chart drive motor 40 are grouped together and enter the recorder by means of a conduit 43 engaging with the connector 44.

The recorder shown is a two pen recorder but the servomotor or receiver structures and pen structures (to be described hereinafter) are substantial duplicates so that but one of the servomotors or receivers and but one of the pen structures will be described.

This servomotor or receiver comprises a pipe 45A which leads to a header 46A having in it a manually variable restriction formed by a needle valve 46R. Such a restriction damps out any unwanted, high frequency fluctuations of the incoming signal. A second pipe 47A connects to a rigid, stationary casing 48A in which is mounted a flexible member such as a bellows (not shown) biased in opposition to the air pressure within the casing by a spring (not shown). Such a receiver is one type of air-operated motor which may be employed to actuate the indicating pointers or recorder pens. If desired, electric motors can be used for this purpose. To a movable part of this flexible member is fixed a vertical, rigid member having pivotal engagement at its upper end with a block 49A secured in an adjusted position in a notch in a flat plate 50A pivoted at 51A. A screw 70A passes loosely through block 49A and is screw threaded to an ear 71A fastened on plate 50A. Spring 72A holds block 49A against the head of screw 70A. Rotation of screw 70A adjusts the span or range of travel of the indicator or pen. A first or input lever 52A has a part 73A having an ear 74A on it and is secured to plate 50A and is adapted to rotate with it about pivot 51A. A second part 75A is loosely pivoted about 51A. A screw 77A screw threadedly engages ear 76A on second part 75A and passes loosely through ear 74A also. A spring 78A holds the ears 74A and 76A apart to an extent limited by the position of screw 77A. Rotation of screw 77A adjusts the zero or initial or datum position of the indicator or pen. At its left-hand end, part 75A carries a screw 79A which passes through a slot (not shown) in a third part 80A which has a second slot 81A in its cooperating with a pin 82A on part 75A. By means of screw 79A, the effective length of first lever 52A, i.e. the distance from the center of pivot 51A to the center of pivot C (Fig. 4), can be adjusted. This adjustment insures that the output of the four bar linkage (presently to be described) is linear. This will be explained more fully hereinafter in connection with Fig. 7. This adjustment also permits the remaining parts of the linkage to be duplicates or like parts regardless of the length of the input lever. First lever 52A is connected at its left-hand or free end by means of a rockable pivot C to link 53A. Ling 53A is connected by a second rockable pivot CC to arm 54A of a floating, four-armed lever F.

A stationary, vertical plate 55A is mounted on shelf 14 and has two pivots 56A and 57A connected thereto. Second levers or tubes 58A and 59A are connected at their left-hand ends to pivots 56A and 57A, respectively.

At their right-hand ends, second levers or tubes 58A and 59A are pivotally connected by means of rockable pivots 56P and 57P to arms 60A and 61A of the four-armed lever F. The fourth arm 62A of the four-armed lever is much longer than the others and carries at its free or left-hand end an ink reservoir 63A from which projects an elongated capillary tube 64A, comprising a pen, which engages at its tip with the strip chart so as to press the strip chart against roll 35. Lever arm 62A also carries on its free or left-hand end, pointer 11 which cooperates with vertical scale 66.

The second receiver and pen structure is substantially a duplicate of the first except that the first or input lever is shorter and comprises the same elements to which the same reference characters have been applied, distinguished by a B in place of an A. Since four-armed lever and the pen structure elements 54B to 64B, inclusive, are directly behind the same elements of the first pen structure they cannot be seen in Fig. 4.

Operation of recorder

Pointer 10 is moved manually over scale 66 to a point which indicates that value of the signal to be applied to the servomotor which is to serve as the set point or datum or value of the process variable from which deviation is to be measured.

A variable air pressure is applied through pipe 45A, header 46A, restriction 46R, and pipe 47A to the space enclosed between rigid casing 48A and the flexible member, which forms a movable wall thereof. This pressure compresses the spring, which biases the flexible member, to a greater or less extent. Variations in this air pressure cause block 49A to move vertically and rock plate 50A and first lever 52A about pivot 51A. Movement of the free end of lever 52A causes link 53A to move the four-armed lever F so that the pointer 11, on the free end of arm 62A, moves vertically in a straight line over scale 66 and pen 64A moves vertically in a straight line over the chart. When the knob 12 is in the position in which it is shown in Figs. 1 and 2, the signal or air pressure applied to servomotor 48A is the set point pressure applied to the controller. This set point pressure is varied by turning knob 8 until pointer 11 is aligned with pointer 10 thus indicating that the set point pressure applied to the controller has the value desired.

Fig. 7 shows in greater detail the way in which the four-bar linkage converts the small, oscillating movement of the input lever to large, linear movement of the indicator or of the pen.

The lowermost position of the linkage is the zero or initial or datum position and is shown in short dash lines. The pointer 11 and the pen 64A are adjusted to this position by rotation of screw 77A (Fig. 4). The movement of the flexible member in casing 48A (Fig. 4) is not exactly linear. Link 53A is caused to move from an initial, lowermost position; in which the pivots C and CC are in a substantially vertical plane; through an intermediate position, in which pivot C is to the left of pivot CC; to a full-scale, uppermost position, in which the pivots C and CC are again in a substantially vertical plane. In Fig. 7 the intermediate position is shown in full lines and the uppermost position is shown in long dash lines. The movement of link 53A corrects for the non-linearity of movement of the flexible member and causes the pointer 11 and the pen 64A to move in equal increments of linear travel for equal increments of change in pressure in the servomotor 48A. In other words, the ratio between change in pressure in the servomotor 48A and the vertical travel of the indicator 11 or of the pen 64A is constant over the range of travel of the indicator or of the pen.

Fig. 8 shows a modification of the linkage for producing straight line motion. In Fig. 8, the same reference characters have been applied to corresponding parts except that a C has been used instead of an A. The first or input lever 52C pivots about point 51C. The left-hand or free end of lever 52C is connected by means of a rockable pivot C to link 53C. A second rockable pivot CC connects the opposite end of link 53C directly to an intermediate point of the floating lever FC. Stationary pivots 56C and 57C provide mounting for one end of second lever or supporting links 58C and 59C. The opposite ends of these second lever or links 58C and 59C are connected by means of rockable pivots 56P and 57P to the floating lever FC.

Fig. 9 shows a second modification of the linkage for producing straight line motion. In Fig. 9, the same reference characters have been applied to corresponding parts except that a D has been used, instead of an A. The first or input lever 52D pivots about point 51D. Instead of connecting to a link the free or left-hand end of lever 52D has a pin and slot connection directly to the floating lever FD. In Fig. 9, this connection is shown as a slot 53D in lever 52D and a pin 53DD mounted on floating lever FD and riding in slot 53D. Obviously, the slot could be in the floating lever FD and the pin secured to lever 52D. The other parts of the linkage are as shown in Figs. 4 and 7.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. In an instrument for indicating, recording, or controlling an industrial process, including, a case comprising a rectangular box having a closed back and an open front, a chassis slidably mounted in said case so as to fit therein or to be withdrawn therefrom, a servomotor mounted on said chassis and movable in response to a signal applied thereto, a linkage actuated by said servomotor comprising a first lever connected to said servomotor so as to be oscillated thereby over a small arc about a fixed pivot, a four-armed lever having two horizontal arms substantially parallel to said first lever when said first lever is midway between the limits of its arc of travel and having two vertical arms, a link pivoted to said first lever at a point spaced from said fixed pivot and pivoted to one of said horizontal arms at a point spaced from said first lever, a pair of second levers each pivoted at one point on one of a pair of fixed pivots located in a vertical plane and each pivoted to one of said vertical arms at one of a pair of floating pivots located in a vertical plane and closer together than said fixed pivots, one of said horizontal arms extending between said second levers and having its end remote from said link on the opposite side of said plane containing said fixed pivots, a scale mounted on said chassis and a pointer mounted on said end of said horizontal arm remote from said link and moved by said arm along said scale.

2. In an instrument for indicating, recording, or controlling an industrial process, including, a case comprising a rectangular box having a closed back and an open front, a chassis slidably mounted in said case so as to fit therein or to be withdrawn therefrom, a servomotor mounted on said chassis and movable in response to a signal applied thereto, said servomotor comprising a rigid casing, a flexible member in said casing, a spring in said casing biasing said flexible member in opposition to the air pressure within said casing, a rigid member fixed to a movable part of said flexible member, a linkage actuated by said servomotor comprising a first lever connected to said servomotor so as to be oscillated thereby over a small arc about a fixed pivot, a four-armed lever having two horizontal arms substantially parallel to said first lever when said first lever is midway between the limits of its arc of travel and having two vertical arms, a link pivoted to said first lever at a point spaced from said fixed pivot and pivoted to one of said horizontal arms at a point spaced from said first lever, a pair of second levers each pivoted at one point on one of a pair of fixed pivots located in a vertical plane and each pivoted to one of said vertical arms at one of a pair of floating pivots located in a vertical plane and closer together than said fixed pivots, one of said horizontal arms extending between said second levers and having its end remote from said link on the opposite side of said plane containing said fixed pivots, a scale mounted on said chassis, and a pointer mounted on said end of said horizontal arm remote from said link and moved by said arm along said scale.

3. In an instrument for indicating, recording, or controlling an industrial process, including, a case comprising a rectangular box having a closed back and an open front, a chassis slidably mounted in said case so as to fit therein or to be withdrawn therefrom, a scale mounted on said chassis, a flexible strip mounted on said chassis adjacent said scale, a first pointer having a portion yieldingly stressed by said strip against said scale and a portion overlying said scale to indicate a selected point on said scale, a servomotor mounted on said chassis and movable in response to a signal applied thereto, a linkage actuated by said servomotor comprising a first lever connected to said servomotor so as to be oscillated thereby over a small arc about a fixed pivot, a four-armed lever having two horizontal arms substantially parallel to said first lever when said first lever is midway between the limits of its arc of travel and having two vertical arms, a link pivoted to said first lever at a point spaced from said fixed pivot and pivoted to one of said horizontal arms at a point spaced from said first lever, a pair of second levers each pivoted at one point on one of a pair of fixed pivots located in a vertical plane and each pivoted to one of said vertical arms at one of a pair of floating pivots located in a vertical plane and closer together than said fixed pivots, one of said horizontal arms extending between said second levers and having its end remote from said link on the opposite side of said plane containing said fixed pivots, and a second pointer mounted on and moved by said linkage along said scale to indicate on said scale the value of the signal applied to said servomotor.

4. A four bar linkage for converting a small, angular, input movement into a large, linear, output movement, said linkage including, an input lever pivoted to oscillate over a small arc about a fixed pivot, a link pivoted to said input lever at a point spaced from said fixed pivot, a floating lever movable in a straight line and pivoted to said link at a point spaced from said input lever, when said input lever is at one point of its arc of travel the pivot between said input lever and said link and the pivot between said link and said floating lever defining a straight line parallel to the straight line in which said floating lever moves, a pair of supporting links each mounted on a fixed pivot, said fixed pivots being located in a plane perpendicular to the line connecting the axis of the fixed pivot of said input lever and the axis on which said link is pivoted to said input lever when said input lever is at the midpoint of its arc of travel, said supporting links being each pivoted to an arm of said floating lever at points located in a plane parallel to the straight line in which said floating lever moves, said pivotal connections being closer together than said fixed pivots, the pivot between said link and said floating lever being midway between the pivotal connections between said supporting links and said floating lever, and an arm on said floating lever extending substantially parallel to said input lever when said input lever is at the midpoint of its arc of travel, an indicator mounted on said last mentioned arm of said floating lever, and a stationary scale over which said indicator travels.

5. In a recorder having a pen for making records on a chart, a straight-line-producing linkage including an input lever mounted on a fixed pivot, a motor connected to said input lever so as to rock said lever about said fixed pivot to and fro over a short arc, a link pivoted to said input lever at a point spaced from said fixed pivot, a floating lever pivoted to said link at a point spaced from said input lever, a pair of supporting links each pivoted on a fixed pivot located in a single plane and each pivoted to an arm of said floating lever at points located in a single plane and closer together than said fixed pivots, and a pen located on said floating lever and moved thereby in a straight line, the point at which said link is pivoted to said floating lever being midway between the pivots between said supporting links and said floating lever and further from said fixed pivots than are the pivots between said supporting links and said floating lever.

6. In a device for recording changes in a process variable, a stationary vertical plate, a straight graduated scale extending transversely of said plate in a plane at right angles to the principal plane of said plate, a pair of fixed pivots each mounted on said plate and each aligned with one end of said scale, a servomotor rigidly connected to said plate and movable in response to a signal applied thereto, a linkage actuated by said servomotor and comprising, a first lever connected to said servomotor so as to be oscillated thereby over a small arc about a fixed pivot, a floating lever having a horizontal arm substantially parallel to said first lever when said first lever is midway between the limits of its arc of travel and having two vertical arms, means having a rocking pivotal connection with said first lever and with said floating lever, a pair of supporting levers each pivoted at one point upon one of said pair of fixed pivots mounted on said plate and each located in a vertical plane and each pivoted to one of said vertical arms at one of a pair of floating pivots located in a plane parallel to the plane of said fixed pivots when said floating lever is at one point between the ends of its path of travel and closer together than said fixed pivots, and a pointer mounted on and carried by said horizontal arm of said floating lever and moved thereby in a straight line over said scale, the axis of the rocking pivotal connection between said means and said floating lever being midway between said floating pivots and being further from said fixed pivots than are said floating pivots.

7. In an indicator, a pointer cooperating with a scale, a motor having a reciprocating output element, a flat plate having a notch in it and having an output shaft oscillatable about a fixed pivot, a block slidably mounted in said notch and pivoted to said output element, means providing relative adjustment between said block and said plate thereby to adjust the span of travel of said pointer, and a four bar linkage having an input bar connected to said output shaft so as to be oscillated thereby to and fro over a short arc and having an output bar connected to said pointer so as to move said pointer to and fro in a straight line longer than the arc traversed by said input bar.

8. In an indicator, a pointer cooperating with a scale, a motor having an oscillating output shaft, a linkage causing said pointer to move in a straight line across said scale and including, an input lever having a first part secured to said output shaft and oscillated thereby and a second part rotatable on said shaft as a fixed pivot, means providing relative adjustment between said first and second parts thereby to adjust the initial position of said pointer, a link pivoted to said input lever at a point spaced from said fixed pivot, a floating lever, an oscillatable pivot connecting said link and said floating lever directly together at a point spaced from said input lever, a pair of supporting links each rockable about one of a pair of fixed pivots located in a plane and each pivoted to said floating lever at a point located in a plane substantially parallel to the plane of said fixed pivots and closer together than said fixed pivots, and means supporting said pointer on said floating lever.

9. In an indicator, a pointer cooperating with a scale, a motor having an oscillating output shaft, a linkage causing said pointer to move in a straight line across said scale and including, an input lever connected to said output shaft so as to be oscillated thereby about a fixed pivot to and fro over a short arc, means for adjusting the length of said input lever thereby to adjust the linearity of the path of travel of said pointer, a link pivoted to said input lever at a point spaced from said fixed pivot by said means for adjusting the length of said input lever, a floating lever, an oscillatable pivot directly connecting said link and said floating lever together at a point spaced from said input lever, a pair of supporting links each rockable about one of a pair of fixed pivots located in a plane and each pivoted to said floating lever at a point located in a plane substantially parallel to the plane of said fixed pivots and closer together than said fixed pivots, and means supporting said pointer on said floating lever.

10. In a recorder for making records on a chart, a straight-line-producing linkage, including, a pair of fixed pivots defining a straight line, a pair of supporting links each pivoted on one of said fixed pivots, a floating lever pivoted to said supporting links on movable pivots at points spaced from said fixed pivots and defining a straight line parallel to the straight line between said fixed pivots when said floating lever is at one point of its path of travel, said movable pivots being closer together than said fixed pivots, an input lever mounted on a fixed pivot spaced from said first-mentioned fixed pivots so as to rock to and fro over a short arc, and means providing a pivotal connection directly pivoted to the free end of said input lever and directly pivotally connected to said floating lever at a point equidistant from the movable pivots and located in or closely adjacent to a line connecting said movable pivots.

11. In a recorder for making records on a chart, a straight-line-producing linkage, including, a pair of fixed pivots defining a straight line between them, a pair of supporting links each pivoted on one of said fixed pivots, a floating lever pivoted on said supporting links on movable pivots at points spaced from said fixed pivots, the movable pivots defining a straight line parallel to the line between said fixed pivots when said floating lever is at one point of its path travel, an input lever mounted on a fixed pivot spaced from said first-mentioned fixed pivots so as to rock to and fro over a short arc, and a link directly pivoted to said input lever at a point spaced from said fixed pivot and pivoted to said floating lever at a point equidistant from said movable pivots and located in or closely adjacent to a line connecting said movable pivots.

References Cited in the file of this patent
UNITED STATES PATENTS

| | | |
|---|---|---|
| 2,594,136 | Di Maggio | Apr. 22, 1952 |
| 2,718,794 | Nichols | Sept. 27, 1955 |
| 2,814,549 | Perry | Nov. 26, 1957 |